June 14, 1966   H. W. MULCAHY   3,255,892
FRICTION DRAFT GEAR

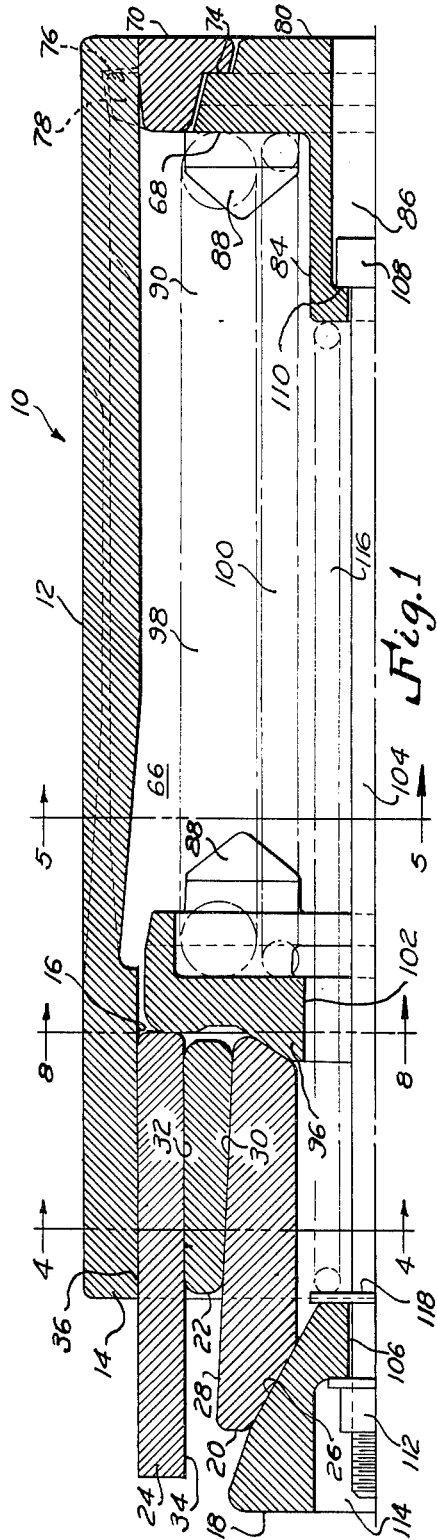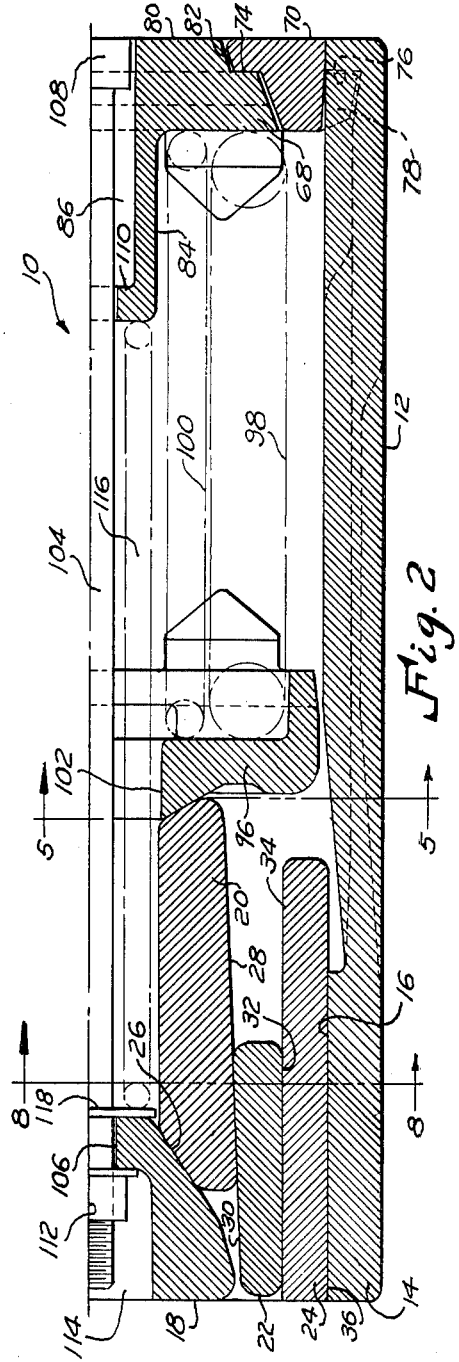

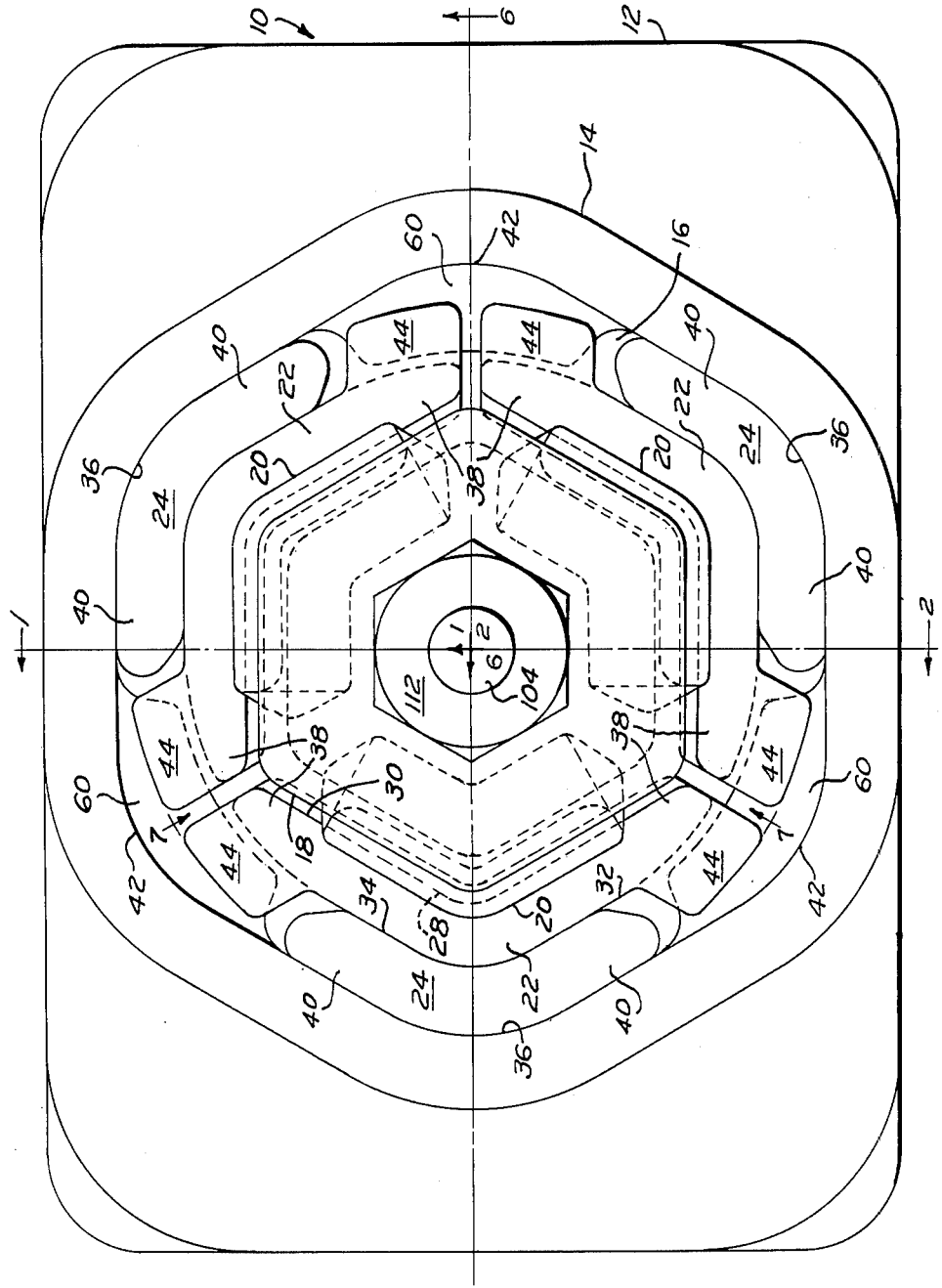

Filed April 27, 1964   6 Sheets-Sheet 3

INVENTOR.
Harry W. Mulcahy
BY
Atty.

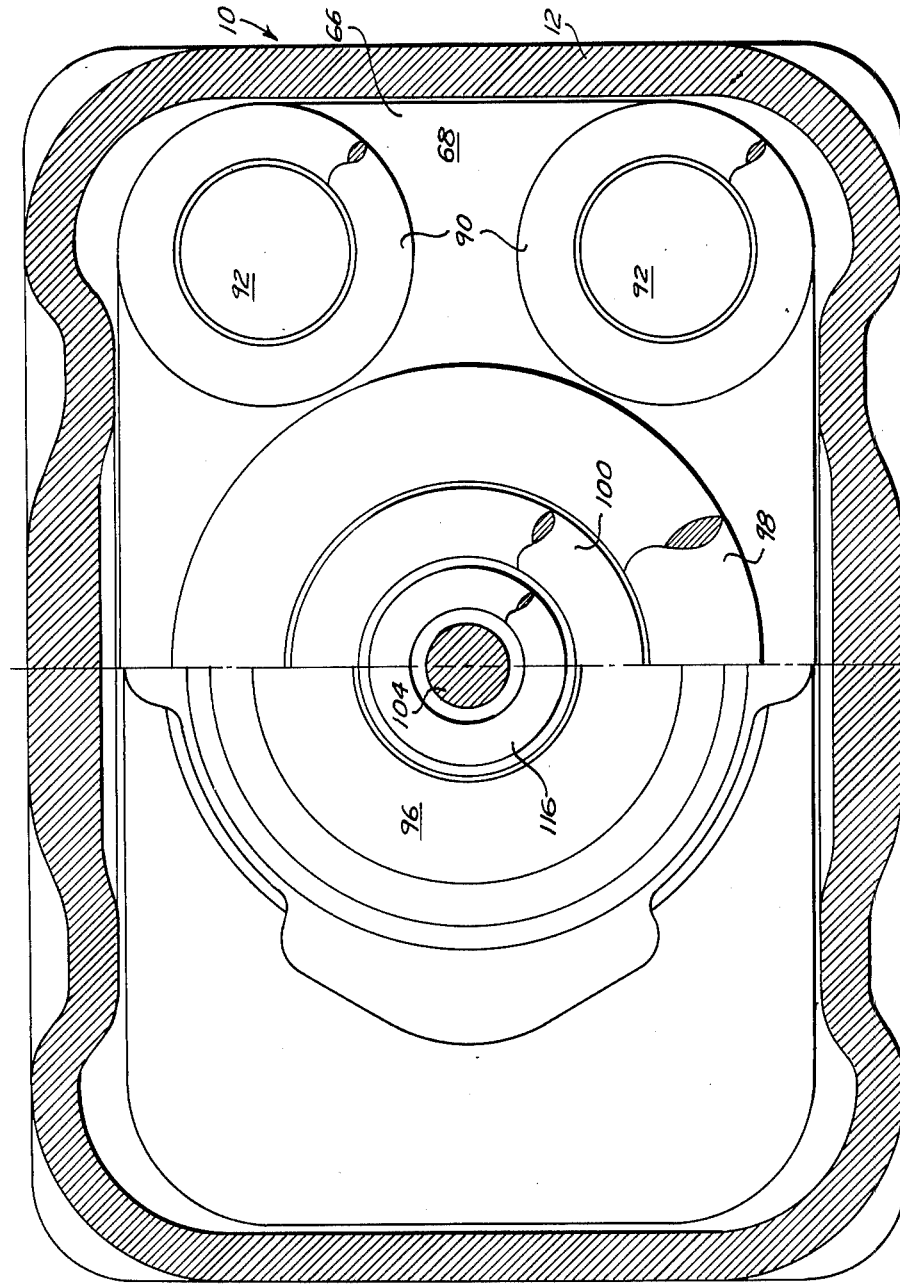

June 14, 1966  H. W. MULCAHY  3,255,892
FRICTION DRAFT GEAR

Filed April 27, 1964  6 Sheets-Sheet 5

INVENTOR.
Harry W. Mulcahy
BY
Atty.

June 14, 1966  H. W. MULCAHY  3,255,892
FRICTION DRAFT GEAR
Filed April 27, 1964  6 Sheets-Sheet 6

INVENTOR.
Harry W. Mulcahy
BY
Atty.

United States Patent Office 3,255,892
Patented June 14, 1966

3,255,892
FRICTION DRAFT GEAR
Harry W. Mulcahy, Chicago, Ill., assignor to W. H. Miner, Inc., Chicago, Ill., a corporation of Delaware
Filed Apr. 27, 1964, Ser. No. 362,809
14 Claims. (Cl. 213—33)

The present invention relates, in general, to friction draft gears and particularly to multiple plate friction draft gears.

Multiple plate friction devices have been previously proposed for use in draft gears utilizing a rectangular friction bore, since the multiple plate friction arrangements offer an increased resistance to impact forces applied to the gear as compared to single friction plates or shoes. However, the configuration of a rectangular friction bore is inherently deficient in that it exhibits high stress concentrations at the four corners thereof. A hexagonal bore is an improvement from this standpoint in that it permits a more uniform distribution of stresses throughout the friction bore while still retaining flat internal friction surfaces which do not complicate the manufacturing process either of the bore or of the mating shoes and wedges. Multiple friction plate arrangements, however, have not been heretofore successfully adapted for use with draft gear utilizing a hexagonally-shaped friction bore. This may have been due to the complexity of the shape involved and the difficulty in economically devising an arrangement for holding the intermediate plate longitudinally stabilized. In other words, the V-shape of the shoes and the bore require that the intermediate and movable friction plates be of comparable configuration but with no complete side of the bore available for coacting with the intermediate plate to stabilize the same, such a multiple plate arrangement in a hexagonal friction bore has not been apparently feasible despite the advantages in such an arrangement.

It is therefore an object of the present invention to provide a multiple friction plate arrangement for use with friction draft gear having a hexagonal bore.

It is another object of the present invention to provide improved means for longitudinally stabilizing certain friction plates of a multiple friction plate arrangement adapted for use in friction draft gear having a hexagonal bore.

Other objects together with the features of this invention will become apparent on examination of the following specifications, claims and drawings, wherein:

FIG. 1 is a cross sectional view taken along one plane, section line 1—1 in FIG. 3, of a portion of a draft gear having a hexagonal bore and illustrating the assemblage in its extended condition;

FIG. 2 is a sectional view of the complementary portion of the gear shown in FIG. 1 taken along the same plane, section line 2—2, in FIG. 3 but with the components illustrated in their closed or compressed condition;

FIG. 3 is a front end elevational view of the draft gear;

FIG. 5 is a sectional view of the right and left halves of FIG. 3, the sections being taken along section line 5—5 as it passes through the compressed and uncompressed conditions depicted in FIGS. 1 and 2, respectively;

Figure 4:
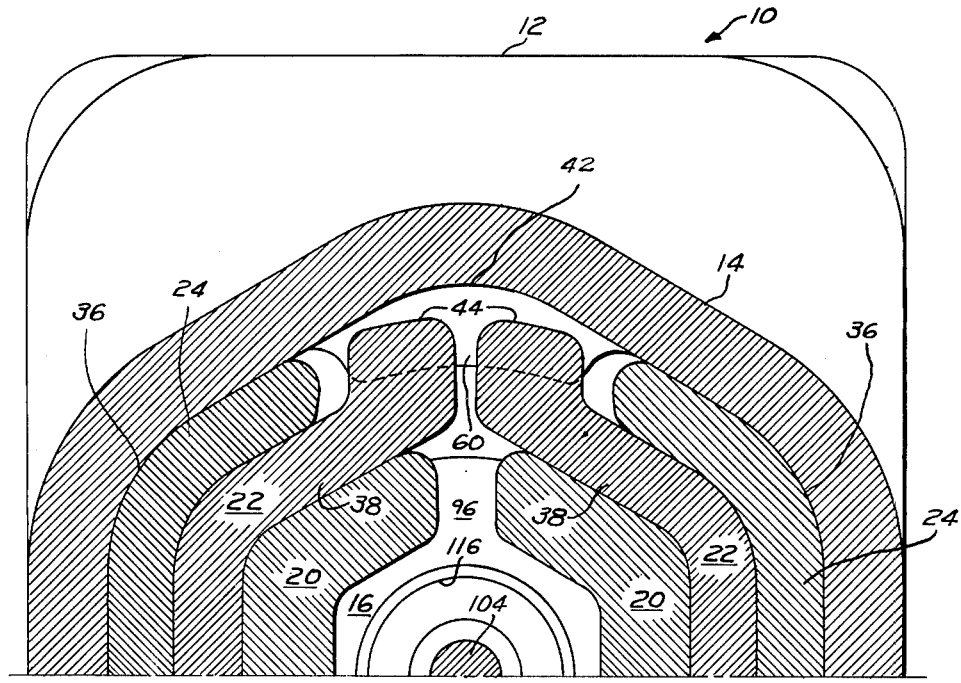
FIG. 4 is a sectional view of the right half of FIG. 3 along the section line 4—4 of FIG. 1.

Referring to the drawings a draft gear is indicated generally by the reference character 10. It comprises a friction casing or cylinder 12 of generally rectangular design having a generally hexagonally-shaped projecting neck 14 at one end. The neck 14 defines a hexagonally-shaped friction bore 16. The friction bore is adapted to receive a wedge 18, generally encircled by a plurality of friction shoes 20 which are in turn generally encircled by a plurality of longitudinally stabilized plates 22 and a plurality of longitudinally movable outer plates 24.

The friction shoes 20 are conventionally V-shaped in cross section with a portion of their inner surfaces being inclined as at 26 for frictional engagement with a corresponding inclined surface on the wedge. The outer surfaces 28 of the friction shoes are tapered inwardly and adapted to be engaged with the inner surface 30 of a corresponding one of the stationary plates 22 with the inner surfaces 30 being tapered at a complementary angle. The outer surfaces 32 of plates 22 are in turn adapted for frictional engagement with correspondingly-shaped inner surfaces 34 on the outer plates 24.

The plates 22 and the plates 24 are also generally V-shaped in cross section with the corners thereof in generally nested relationship and aligned with respective alternate corners 36 of the hexagonal bore 16 so that the relative longitudinal movement therebetween may be maintained without rotation relative to the axis of the bore.

It will be noted that the legs 38 of the stationary plates 22 extend beyond the ends of the legs 40 of the plates 24 and terminate adjacent other corners 42 intermediate the alternate corners 36 of the bore 16. A lug 44 on the end of each leg 38 of the plates 22 projects outwardly toward the adjacent corner 42 and between the legs 40 of the associated plates 24 to aid in restraining the plates 24 from rotational movement.

Figure 7:
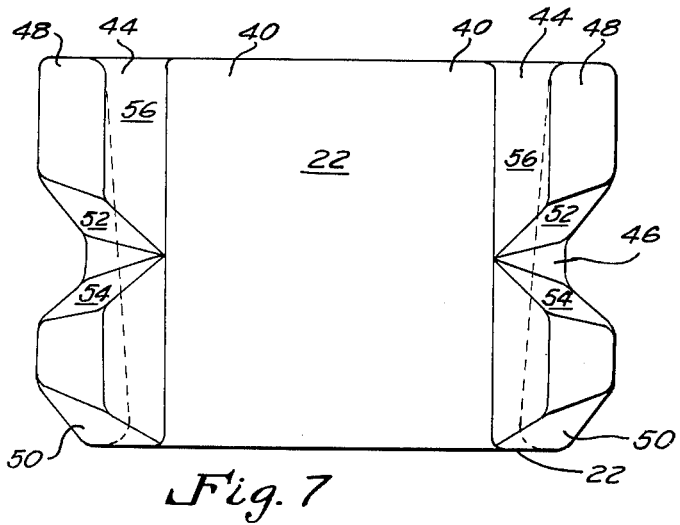
FIG. 7 is a view in side elevation of a longitudinally stabilized plate and taken along section line 7—7 of FIG. 3.
Figure 6:
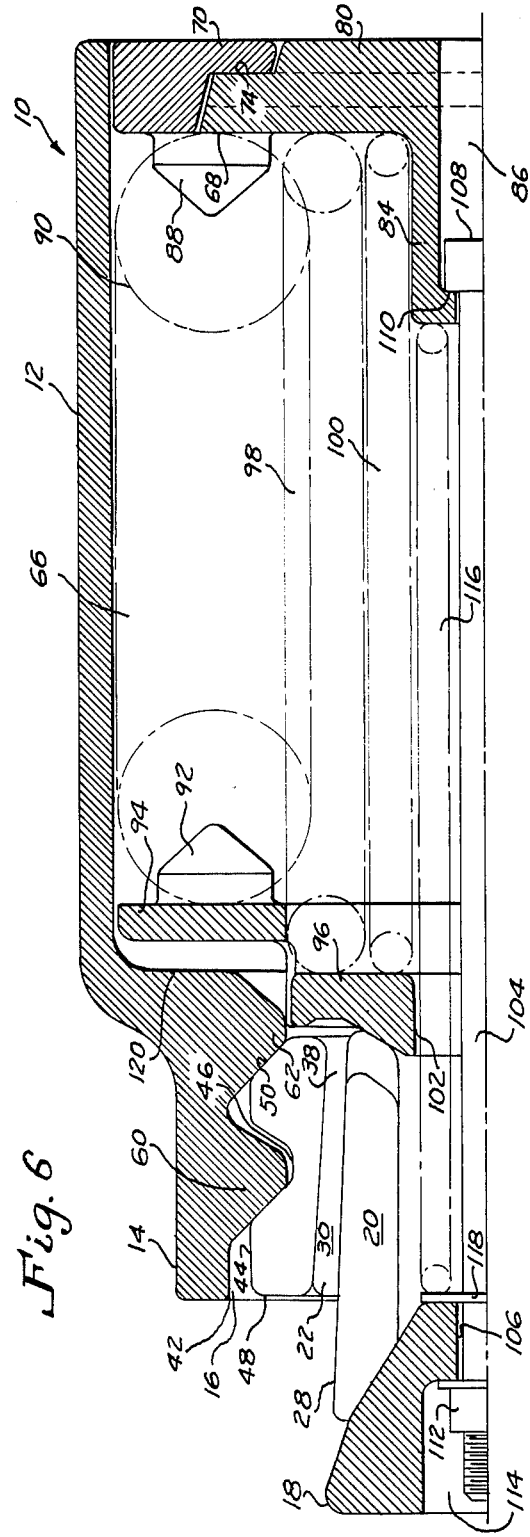
FIG. 6 is a sectional view taken along the section line 6—6 of FIG. 3.
Figure 8:
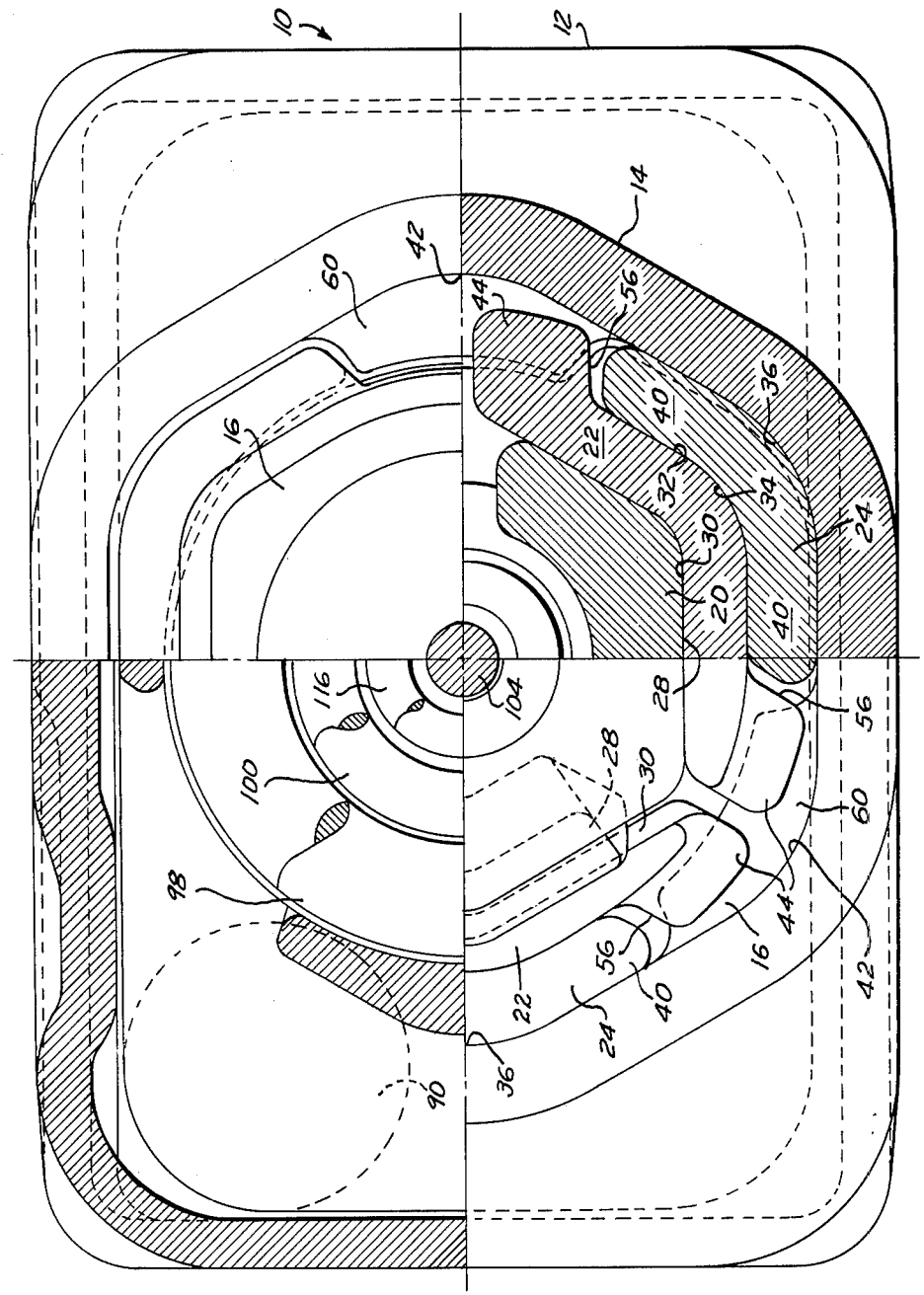
FIG. 8 is a composite front end sectional and elevational view, the upper left quarter being along section line 8—8 of FIG. 1, the lower right quarter being along section line 8—8 of FIG. 2, the lower left quarter being an elevational view and the upper right quarter also being an elevational view but with certain members omitted.

Each lug 44 has a V-shaped recess or notch 46 therein intermediate the front end walls 48 and the rear end walls 50 of the lugs as best seen in FIGS. 6 and 7. The notch 46 has side walls 52 and 54 which are not only inclined outwardly of the apex of the notch but are also inclined inwardly in opposite directions toward the inner wall 56 of the lug so that the notch is, in effect, tapered inwardly of the plate 22. The rear end walls 50 are inclined in a manner similar to walls 52. That is the rear walls 50 slope not only toward the front end wall 48 but also intersect the plane of the inner wall 56 at an acute angle.

The lugs 44 on the ends of adjacent plates 22 are adapted to be engaged by depending spaced apart stops 60 and 62 located at the respective intermediate corners 42 of the bore 16. The stops 60 and 62 are generally V-shaped for engagement with the walls 52 and 54 of the notches 46 and the end wall 50 whereby the plates 22 are longitudinally stabilized while limited radial movement with respect to the axis of the bore 16 is permitted. The stops 60 and 62 at each corner 42 are adapted to traverse a portion of each lug 44 on the ends of adjacent plates 22. Due to the taper of the notch 46 and the angle of wall 50, the stops 60 and 62 cooperate therewith to aid in restraining rotation of the plates 22.

The casing 12 is enlarged behind the neck 14 to define a generally rectangular chamber 66. The rear end of the chamber 66 is closed by a rear wall plate or plug 68 having a periphery corresponding to the shape of the casing. A rear wall ring 70 is engaged against a rear surface 74 on the plate. Lugs 76 on opposite sides of the ring 70 each nest in a respective recess 78 formed in the corresponding walls of the casing to prevent the rearward expulsion of the ring 70 and plug 68 from the casing.

The plug 68 has a rear boss 80 which seats in the opening 82 of the ring. A bolt pocket 84 is also formed on plug 68 by an axially located inwardly extending boss having an aperture 86. In addition the plug 68 has short spring bosses 88 adjacent respective corners against which are seated one end of respective helical springs 90. The opposite ends of the springs seat against respective bosses 92 carried on flanges 94 formed on the follower plate 96. A pair of coaxially arranged helical springs 98 and 100 are seated on the bolt pocket 84 and between the rear plug 68 and the follower plate 96 for maintaining the plate 96 engaged with the ends of the shoes 20.

The follower plate 96 has a central aperture 102 axially aligned with aperture 86 in the bolt pocket. An assembly bolt or rod 104 passes through the apertures 86 and 102 and through an aperture 106 in the wedge 18. The rod 104 has a head 108 at one end which is seated against a shoulder 110 in the bolt pocket. The other end of the rod 104 is threaded and receives a nut 112 located in a recess 114 of the wedge 18 whereby the wedge and shoes 20 are maintained engaged with the casing 12 despite the expansive force of the springs. In addition, a wedge biasing spring 116 encircling the rod 104 is located between the bolt pocket and a washer 118 seated against the inner surface of the wedge 18.

In assemblying the draft gear 10, the follower plate 96 is inserted through the rear of the casing 12 after which the springs 90, 98 and 100 are inserted. The rear plate or plug 68 is then inserted and pressure applied to the plug 68 not only to move the flanges 94 on the follower plate 96 against walls 120 of the chamber 66, but further applied to permit the ring 70 to be canted and inserted in the casing so that the lugs 76 can be moved into the casing 12. The pressure is then relieved to allow the springs to force the rear plate 68 and ring 70 rearwardly and securely seat the lugs 76 in the recesses 78 to thereby prevent the rearward expulsion of the plate and ring.

The plates 24 are then seated in the respective corners 36 of the bore 16, whereafter the plates 22 are inserted in the bore with lugs 44 engaging stops 60 and 62. Friction shoes 20 are then inserted in the bore 16 with the spring 116 and bolt 104 being assembled either before or after the plates 22 and 24 and shoes 20 are assembled, depending on which is most convenient. With the bolt 104 and spring 116 in position, the wedge 18 is assembled thereto and pressure is applied to the wedge to enable the nut 112 to be threaded a desired distance onto the bolt 104 for maintaining the wedge in its assembled position.

When the draft gear 10 is subjected to impact forces, the wedge 18 is moved inwardly against the resistance of the springs. As the wedge moves inwardly, the frictional engagement with shoe surface 26 provides initial resistance to the impact force while the shoes 20 moves inwardly and radially of the axis of the wedge and bore to force the plates 22 firmly against the stops 60 and 62 while applying radial compressive force against the plates 24. As the impact force continues and the wedge moves inwardly, the plates 24 are engaged, by a conventional wedge follower, not shown, and also move inwardly of the casing. Since the impact force is thus translated into compressive engagement between the plates 22 and 24 and against the inner friction surfaces of the bore 16, a considerable increase in resistance to the impact force is available so that extremely large impact forces can be efficiently dissipated.

On release of the impact pressures, the spring 118 acts directly on the wedge to facilitate its release which is also aided by the blunt angle at which surface 26 intersects with the wedge. Springs 90, 98 and 100 act on the follower 96 directly, which in turn serves to return the shoes 20 and the plates 22 and 24 together with the wedge, towards their normal extended non-compressed position.

The foregoing description relates to the details of one embodiment of a multiple plate draft gear having a hexagonal bore and the inventive concepts of which are additionally set forth in the accompanying claims.

What I claim is:

1. A draft gear comprising a casing having a hexagonally-shaped friction bore at one end, a wedge having a hexagonal periphery and axially carried in said bore, and a plurality of stacked plates for each alternate corner of said wedge and being generally V-shaped in cross section and in nested engagement in each of said corners, means for restraining an intermediate one of said plates from axial movement along said bore, and means for translating axial movement of each plate adjacent the periphery of said wedge into radial movement of the respective intermediate plates, whereby a buffing force applied to each plate nested between the intermediate plates and the respective corner of said bore is resisted by the frictional engagement between said intermediate plate and its respective nested plate.

2. In a friction draft gear having a casing with a hexagonal friction bore adapted to receive a wedge and a plurality of friction shoes each engaging a different portion of the periphery of said wedge and each presenting a V-shaped surface toward the periphery of said bore, the improvement comprising a plate for each shoe with each plate having a V-shaped cross section and located between each shoe and the internal periphery of said bore, stop means extending from said casing into said bore for restraining axial movement of each plate along the axis of said bore while permitting radial movement with respect to the axis of said bore, and a friction plate having a V-shaped cross section and nested between the internal periphery of said bore and a respective one of said restrained plates and adapted to be operated during buffing movement of said wedge for frictional movement over the associated restrained plate.

3. The gear claimed in claim 2 in which said stop means is located at respective corners of said bore and is adapted to simultaneously engage the adjacent legs of adjacent restrained plates.

4. In a friction draft gear having a casing with a hexagonal friction bore adapted to receive a wedge and a plurality of friction shoes each engaging a different portion of the periphery of said wedge and a follower plate in said casing biased against said shoes by resilient means carried in said casing between said plate and a rear wall structure on said casing, the improvement comprising a plate located between each shoe and the internal periphery of said bore, means restraining inward and outward movement of said plates relative to said casing while permitting radial movement with respect to the axis of said bore, and a friction plate nested between the internal periphery of said bore and a respective one of said restrained plates and adapted to be operated during buffing movement of said wedge for frictionally engaging one surface of the respective restrained plate while the other surface of said restrained plate is engaged by a respective friction shoe.

5. The draft gear claimed in claim 4 in which all of said plates are V-shaped in cross section with the apex of each V aligned with a respective alternate corner of said bore.

6. In a fraction draft gear having a casing with a hexagonal friction bore, a wedge adapted to be received in said bore for axial movement along said bore, a plurality of friction shoes each engaging a different portion of the periphery of said wedge, a follower plate in said casing normally biased against said shoes, a plate located between each shoe and the internal periphery of said bore, lug means on opposite ends of each plate, stop means depending from said casing and located adjacent alternate corners of said hexagonal bore for engaging said lug means for restraining axial movement of the plates relative to said bore while permitting radial movement with respect to the axis of said bore, and a friction plate adapted to be engaged with each restrained plate and adapted to be axially moved along said bore during buffing movement of said wedge for frictionally engaging one face of the respective restrained plate.

7. The draft gear claimed in claim 6 in which said lug means each has a notch transverse to the longitudinal axis of the plate, and said stop means at each corner simultaneously engages the notch in the lugs of adjacent restrained plates.

8. The draft gear claimed in claim 7 in which each notch is tapered inwardly towards the respective plate whereby said stop means is adapted to restrain rotational movement about the axis of said bore by said restrained plates.

9. The draft gear claimed in claim 7 in which said notch is generally V-shaped, and said stop means has a corresponding configuration.

10. In a friction draft gear having a casing with a hexagonal friction bore adapted to receive a wedge and a plurality of friction shoes each engaging a different portion of the periphery of said wedge and each presenting a V-shaped surface toward the periphery of said bore, the improvement comprising a plate for each shoe with each plate having a V-shaped cross section and located between each shoe and the internal periphery of said bore with the one surface of each plate being tapered and adapted to engage a complementary-shaped surface on said shoe, lug means on the end of each leg of each plate, stop means carried at spaced apart positions on said casing and projecting into said bore for cooperation with said lug means to restrain movement of each plate along the axis of said bore while permitting radial movement with respect to the axis of said bore, and a friction plate having a V-shaped cross section and nested between the internal periphery of said bore and each of said restrained plates and adapted to be operated during buffing movement of said wedge for frictional movement over the associated surface of the restrained plate while said one surface of said restrained plate is frictionally engaged by said complementary surface of a respective friction shoe.

11. In a friction draft gear having a casing with a hexagonal friction bore, a wedge adapted to be received in said bore for axial movement therealong, a plurality of friction shoes each having a tapered friction face for engaging a corresponding face on the periphery of said wedge whereby each shoe is adapted to move axially inwardly along said bore and radially of said bore on the application of a buffing force to said wedge, each friction shoe having a generally V-shaped cross section with its outer surface being tapered inwardly toward said casing and the apex of said V being aligned with a respective corner of said bore, a plate corresponding in shape to each shoe and located between each shoe and the respective corner of said bore with the inner surface of each plate having a taper complementary to the taper on the outer surface of the respective shoe whereby each shoe is adapted to be moved radially outwardly on movement of said shoes inwardly of said bore along said axis, a lug on each end of each plate aligned with respective intermediate corners of said bore between said first-mentioned corners, stop means at each of said intermediate corners for restraining axial movement of said plates, and a generally V-shaped friction plate nested between a first-mentioned corner of said bore and a respective one of said restrained plates and adapted to be moved axially inward of said bore during buffing movement of said wedge for frictionally engaging the outer surface of the respective restrained plate.

12. A draft gear comprising a casing having a hexagonally-shaped friction bore at one end connected with a rectangularly-shaped chamber at the other end, a follower plate between said bore and chamber having rectangularly-shaped flanges axially movable in said casing, a rear wall structure for said chamber, resilient means between said rear wall structure and said follower plate for biasing said plate toward said bore, a wedge axially carried in said bore, a plurality of friction shoes each being generally V-shaped in cross section and having a friction surface for engagement with a correspondingly-shaped surface on the periphery of said wedge, the apex of each V-shaped shoe being aligned with a respective alternate corner of said bore, a stabilized plate for each shoe of corresponding cross sectional shape and having a tapered surface for frictional engagement with a complementary-tapered surface on said shoes, a lug on the end of each leg of said plate extending toward the corners of said bore intermediate said alternate corners, a stop located at each intermediate corner for engaging the lugs on the ends of the legs of adjacent plates to stabilize said plates against longitudinal and rotational movement while permitting limited radial movement in said bore, and another V-shaped friction plate for each stabilized plate with the apex of said other plate engaged in a respective alternate corner and the ends of said friction plate being nested between the end lugs of the adjacent stabilized plate whereby the movement of said wedge toward said chamber during application of a buffing force moves said shoes toward said chamber and radially outward in said bore to compress said stabilized plates against said other friction plates whereby said other friction plates provide increased frictional resistance to axial movement in response to the application of a buffing force thereto.

13. In a frictional draft gear having a casing with a hexagonal friction bore, a wedge adapted to be received in said bore for axial movement along said bore, a plurality of friction shoes each engaging a different portion of the periphery of said wedge, a plate located between each shoe and the internal periphery of said bore, lug means on opposite ends of each plate having a generally V-shaped notch therein tapered inwardly of said plate and an end wall parallel to one wall of said notch, stop means projecting from said casing and located adjacent alternate corners of said hexagonal bore for engaging said lug means for restraining axial movement of the plates relative to said bore while permitting radial movement with respect to the axis of said bore, said stop means comprising a pair of spaced apart lugs one of which is generally V-shaped and adapted to engage said notch and the other of which is adapted to engage said one end wall, and a friction plate adapted to be engaged with each restrained plate and adapted to be axially moved along said bore during buffing movement of said wedge for frictionally engaging one face of the respective restrained plate.

14. A draft gear comprising a casing having a hexagonally-shaped friction bore at one end connected with a chamber in said casing, a wedge axially carried in said bore, resilient means carried in said chamber for biasing said wedge outwardly of said bore, a plurality of friction shoes each being generally V-shaped in cross section and having a friction surface for engagement with a correspondingly-shaped surface on the periphery of said wedge, the apex of each V-shaped shoe being aligned with a respective alternate corner of said bore, a stabilized plate for each shoe of corresponding cross sectional shape and arranged for frictional engagement with said shoes and having enlarged lugs at the sides thereof, each lug of said plate extending toward the corners of said bore intermediate said alternate corners with a notch transverse to the longitudinal axis of said bore being provided centrally of said lugs, a stop located at each intermediate corner for engaging the notch in the lugs of adjacent plates to stabilize said plates against longitudinal and rotational movement while permitting limited radial movement in said bore, and another V-shaped plate for each stabilized plate with the apex of said other friction plate engaged in a respective alternate corner and the ends of said friction plate being nested between the end lugs of the adjacent stabilized plate whereby the movement of said wedge toward said chamber during application of a buffing force moves said shoes toward said chamber and radially outward in said bore to compress said stabilized plates against a respective other plate whereby said other plates present increased frictional resistance to longitudinal movement in response to the application of a buffing force thereto.

References Cited by the Examiner
UNITED STATES PATENTS

| | | | |
|---|---|---|---|
| 1,586,323 | 5/1926 | O'Connor | 213—34 |
| 2,540,561 | 2/1951 | Williams | 213—34 |
| 3,178,036 | 4/1965 | Cardwell | 213—34 |

ARTHUR L. LA POINT, *Primary Examiner.*

B. S. FAUST, *Assistant Examiner.*